United States Patent
Sabo

(10) Patent No.: US 10,634,166 B2
(45) Date of Patent: Apr. 28, 2020

(54) LIFT OUT RAIL SYSTEM

(71) Applicant: A.K. Industries, Inc., Plymouth, IN (US)

(72) Inventor: John S. Sabo, Plymouth, IN (US)

( * ) Notice: Subject to any disclaimer, the term of this patent is extended or adjusted under 35 U.S.C. 154(b) by 374 days.

(21) Appl. No.: 15/805,783

(22) Filed: Nov. 7, 2017

(65) Prior Publication Data

US 2019/0137022 A1 May 9, 2019

(51) Int. Cl.

| | |
|---|---|
| *F04D 29/60* | (2006.01) |
| *F16L 37/26* | (2006.01) |
| *E03F 5/22* | (2006.01) |
| *F04B 53/16* | (2006.01) |
| *F04B 23/02* | (2006.01) |
| *F04D 13/08* | (2006.01) |

(52) U.S. Cl.
CPC .............. *F04D 29/607* (2013.01); *E03F 5/22* (2013.01); *F04B 23/021* (2013.01); *F04B 53/16* (2013.01); *F04D 13/08* (2013.01); *F16L 37/26* (2013.01); *F04D 29/606* (2013.01)

(58) Field of Classification Search
CPC ...... F04D 29/607; F04D 29/606; F04D 13/08; F04B 53/16; F04B 23/021; F16L 37/26; F16L 3/01

USPC ................................................... 285/24, 325
See application file for complete search history.

(56) References Cited

U.S. PATENT DOCUMENTS

| | | | | |
|---|---|---|---|---|
| 686,571 | A | * | 11/1901 | Wilson ..................... F16L 37/26 |
| 1,202,222 | A | * | 10/1916 | Quinn ............................. 285/24 |
| 3,771,915 | A | | 11/1973 | Back |
| 4,564,041 | A | | 1/1986 | Kramer |
| 4,886,426 | A | | 12/1989 | Surinak |
| 5,507,628 | A | | 4/1996 | Masse et al. |
| 2018/0119405 | A1 | * | 5/2018 | Shafer ................... F04D 29/607 |

\* cited by examiner

*Primary Examiner* — Zachary T Dragicevich
(74) *Attorney, Agent, or Firm* — Botkin & Hall, LLP

(57) ABSTRACT

A lift-out pump disconnect system is mounted to two parallel rails that are affixed to a pump enclosure. The disconnect system has a receiver body that is affixed to the rails and slidable along the rail axes with ear portions. The disconnect system further includes an outlet body that mates to the receiver body using tabs that slide on clamping ramped surfaces on the receiver body. Downward movement of the outlet body causes the clamping ramped surfaces to move the outlet body closer to the receiver body until flat sealing surfaces are in biased contact.

16 Claims, 7 Drawing Sheets

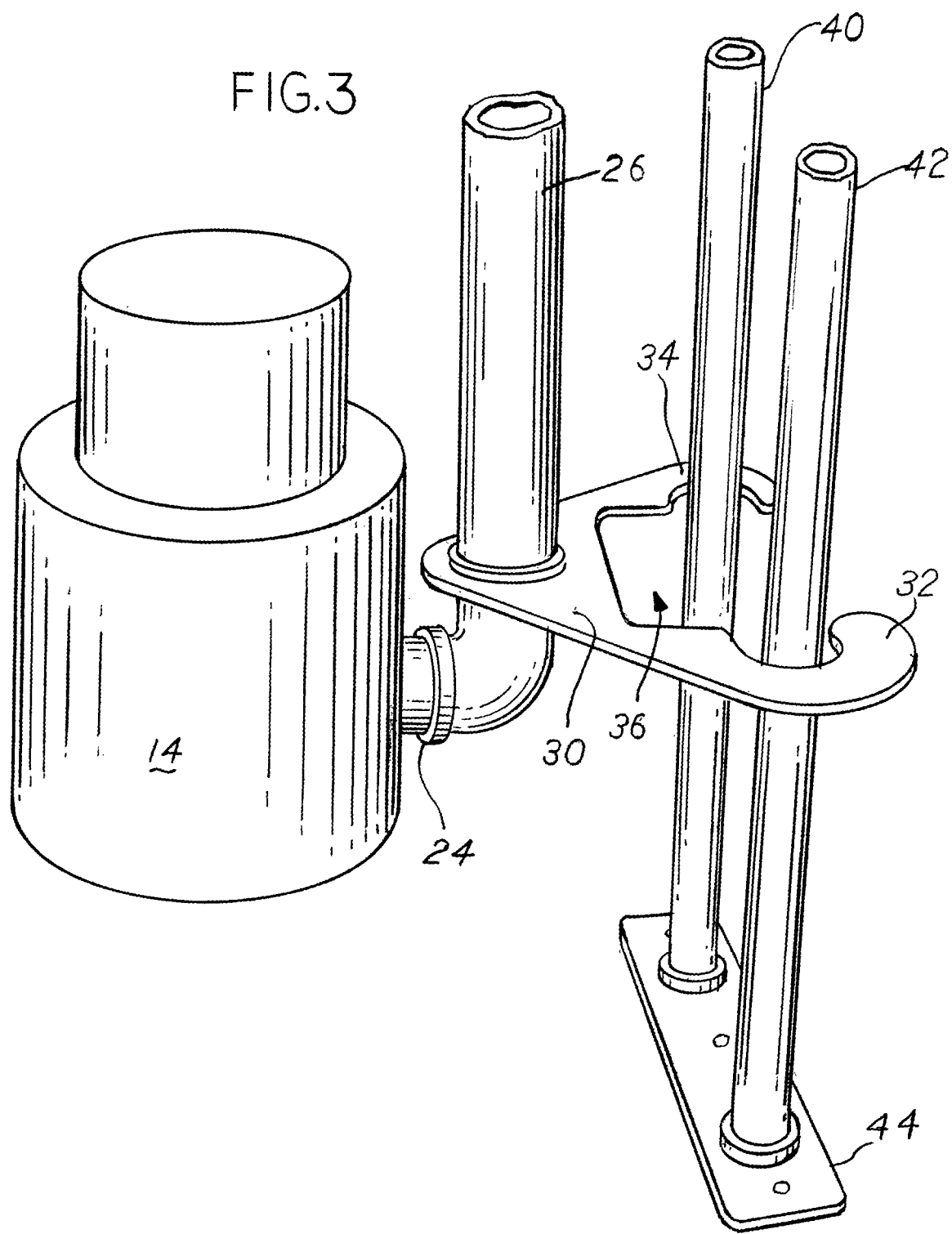

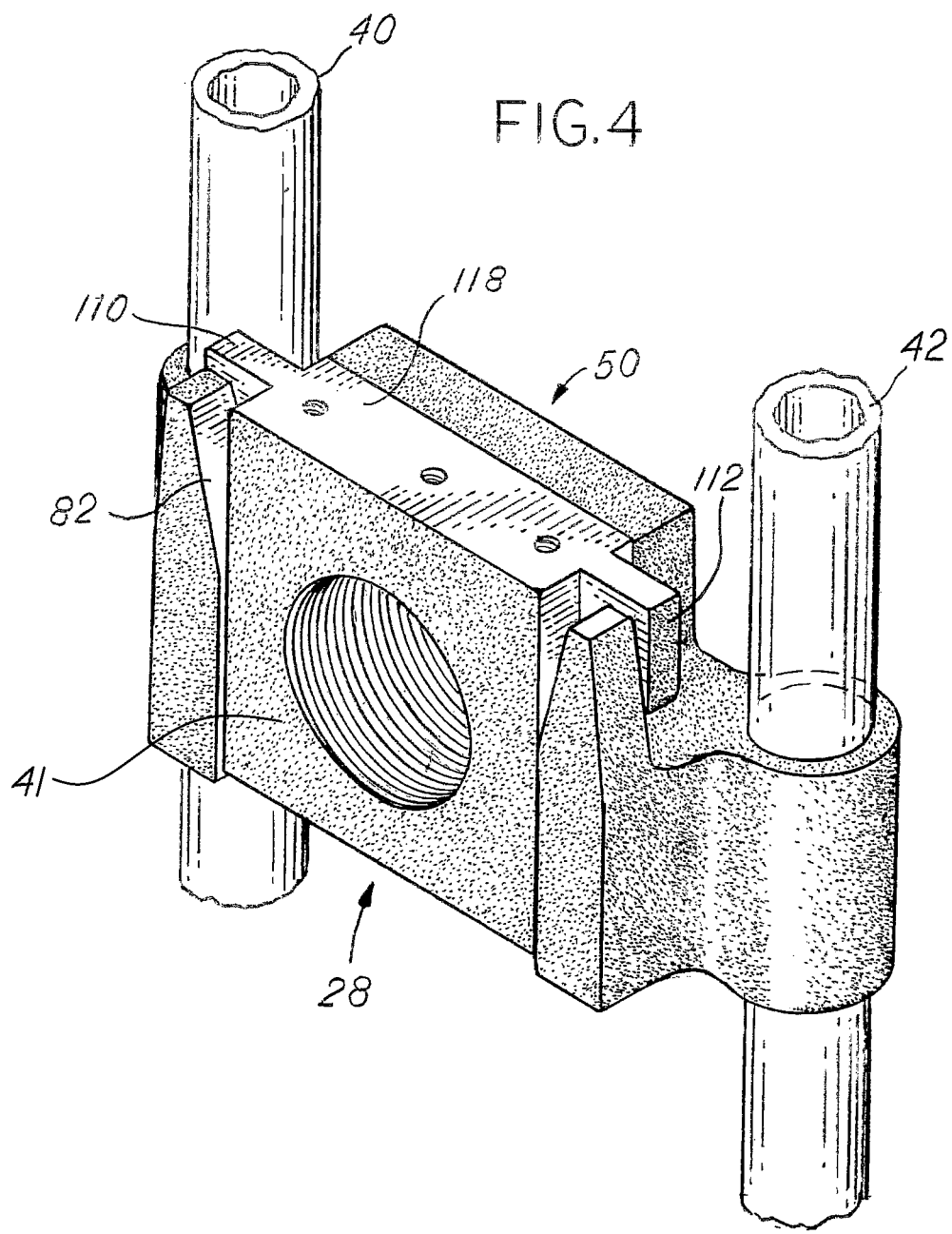

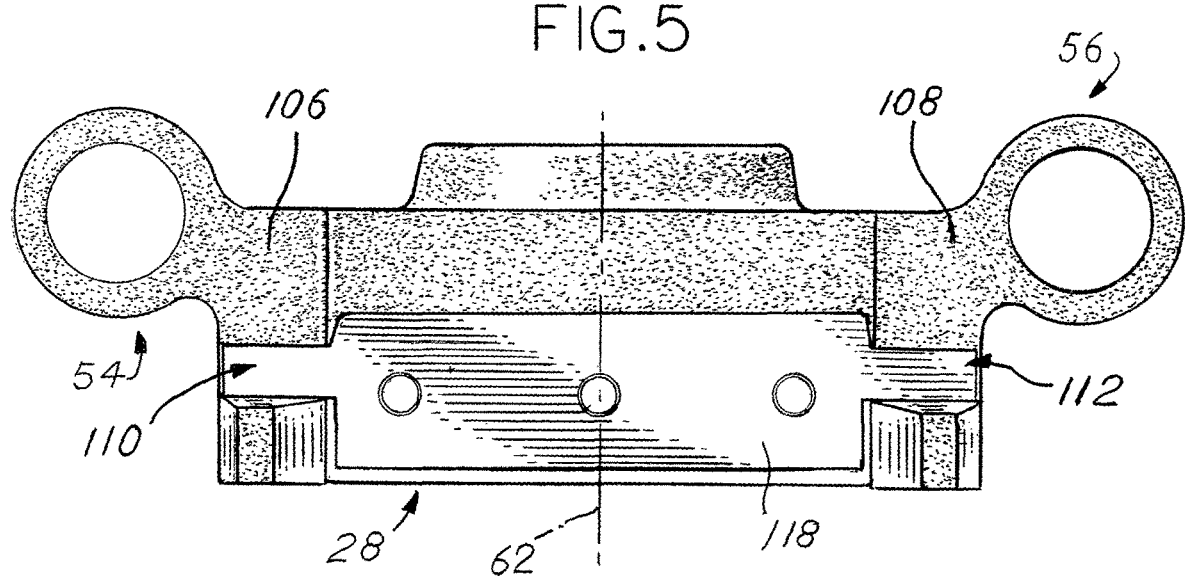
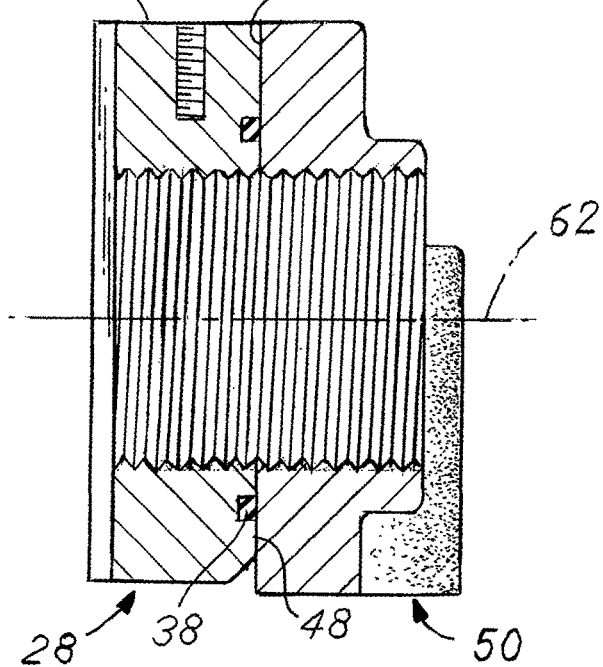

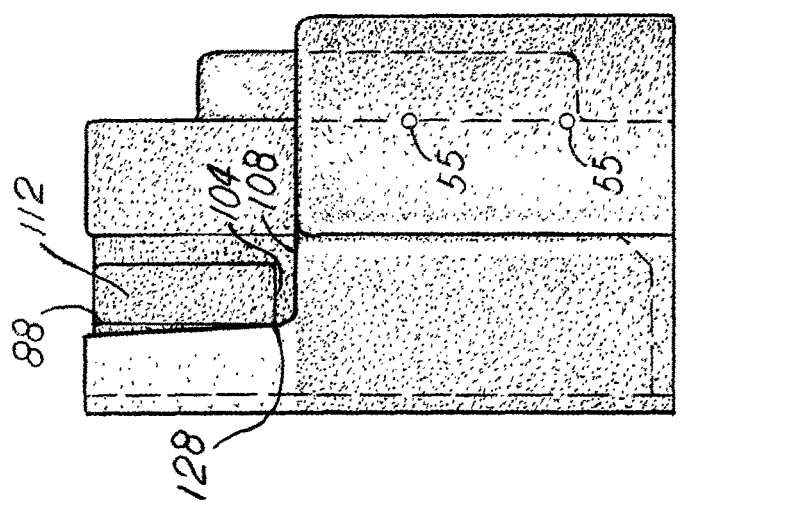
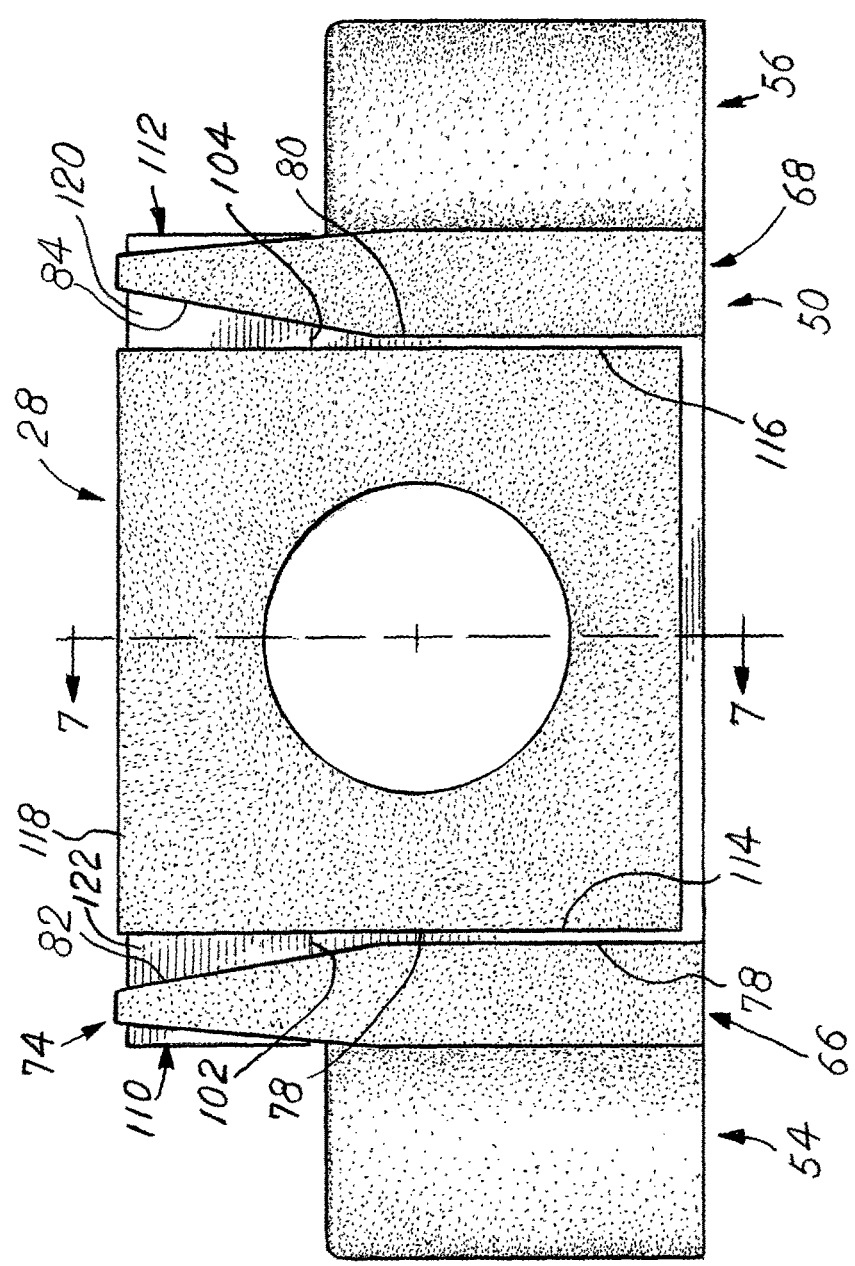

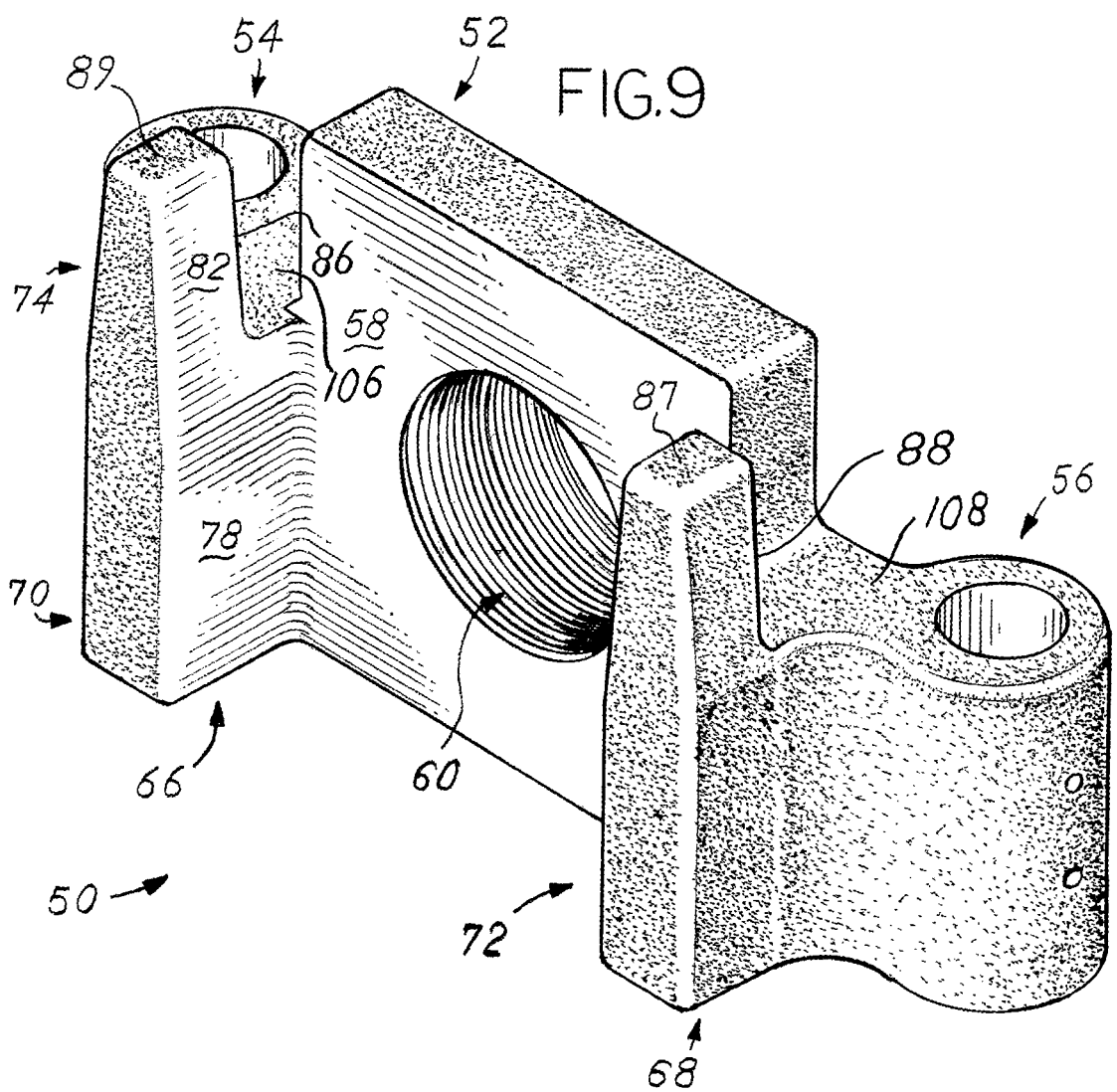

LIFT OUT RAIL SYSTEM

BACKGROUND OF THE INVENTION

This present disclosure relates to submersible pump disconnect systems, particularly sewage lift stations and ejector basins that are typically buried underground. Servicing and replacement of pumps is a necessary and routine event, and it is impractical or impossible to descend into the lift station to disconnect it. Disconnect systems for submersible pumps are commonplace and provide a solution for pump replacement, but these can be difficult to install, disconnect, or reconnect. Some designs have channels that can become filled with debris or corrode, making it difficult to disconnect. Others have pockets that can trap debris that becomes dislodged when the pump is removed, making proper seating and sealing difficult or impossible. Others have solved the issues of removal and debris, but mounting them to the basin requires permanent affixing to guide rails. With differences in terrain and the location of frost lines, the user and installer must be able to locate the disconnect system at a convenient location, usually directly aligned with the outlet pipe of the basin. Measurement issues or field installation modifications may require the disconnect to be raised or lowered for its final installation position. Sometimes this requires field modifications, such as cutting and welding. Field modifications can be expensive and cause delays. An improved disconnect system is needed.

SUMMARY OF THE INVENTION

The present disclosure describes an adjustable and field-configurable rail system that is robust, easily disconnected and reconnected, and easy to install. The rail system can be located on vertical rails at any position and fixed in that position using set screws. The disconnect interface between the outlet body and receiver body is sealed using a face seal between two smooth surfaces. Pressure between the smooth surfaces is maintained using a ramped surface that uses the weight of the pump, outlet body, and all components located between the two to maintain pressure between the outlet body and receiver body.

BRIEF DESCRIPTION OF THE DRAWINGS

A preferred embodiment of this invention has been chosen wherein:

FIG. 3 is a partial isometric view 3 of the system as shown in FIG. 1;

FIG. 4 is a partial isometric view of the system shown in FIG. 1 with the outlet body and receiver body coupled;

FIG. 5 is a top view of the receiver body coupled to the outlet body;

FIG. 6 is a front view of the receiver body coupled to the outlet body;

FIG. 7 is a section view 7-7 of the receiver body coupled to the outlet body as shown in FIG. 6;

FIG. 8 is a side view of the receiver body coupled to the outlet body as shown in FIG. 6; and FIG. 9 is an isometric view of the receiver body.

DESCRIPTION OF THE PREFERRED EMBODIMENT

Figure 1:
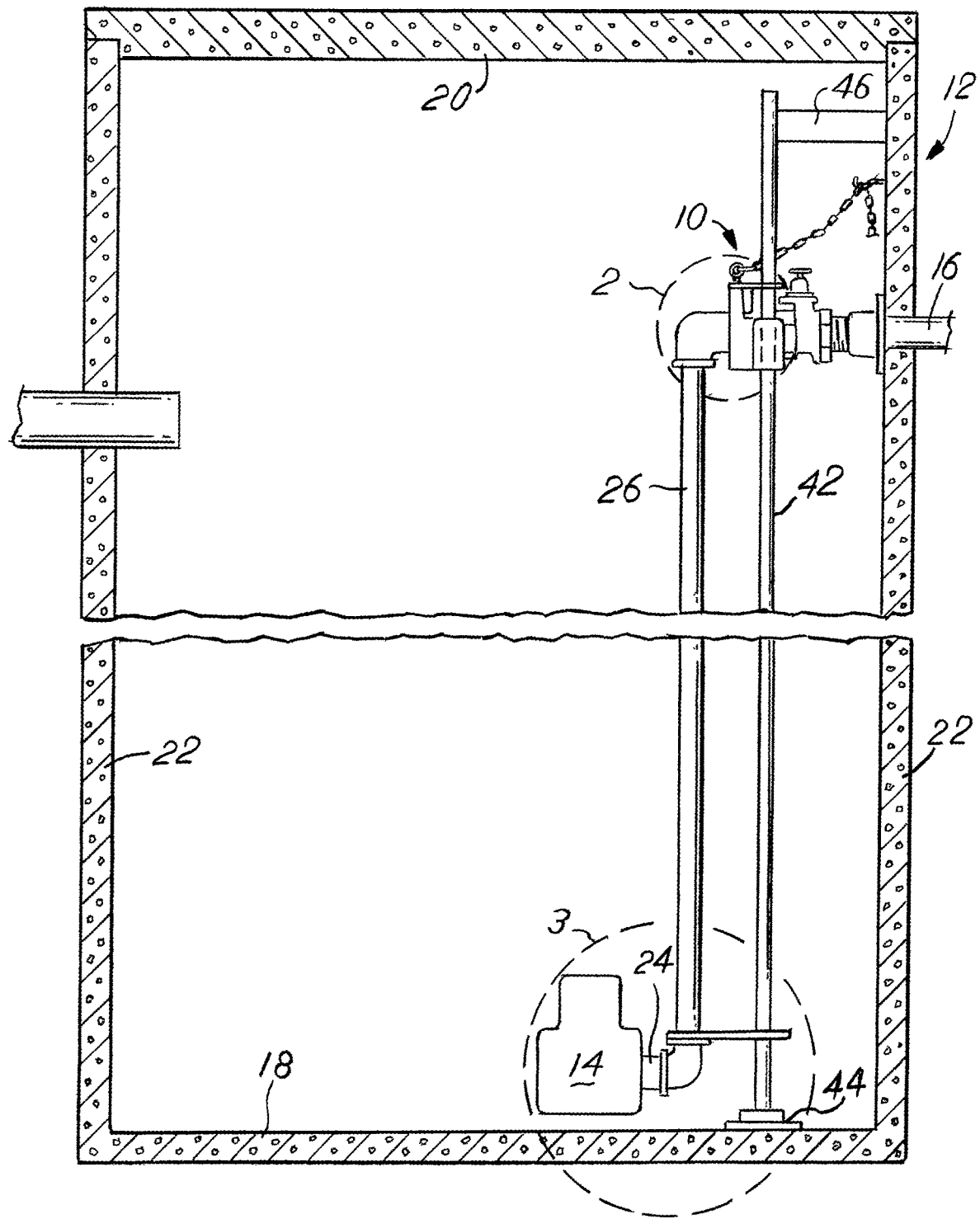
FIG. 1 is a side section view of the system as installed in a sewage basin.

A rail disconnect system 10 is shown in FIG. 1 that is used for installation and servicing of submersible pumps 14, such as ones used in lift/transfer basins for sewage or wastewater. The system 10 is located inside a basin 12 and is used to connect a pump 14 to an outlet 16. The basin 12 has a floor 18, a lid 20, and a sidewall 22.

Figure 2:
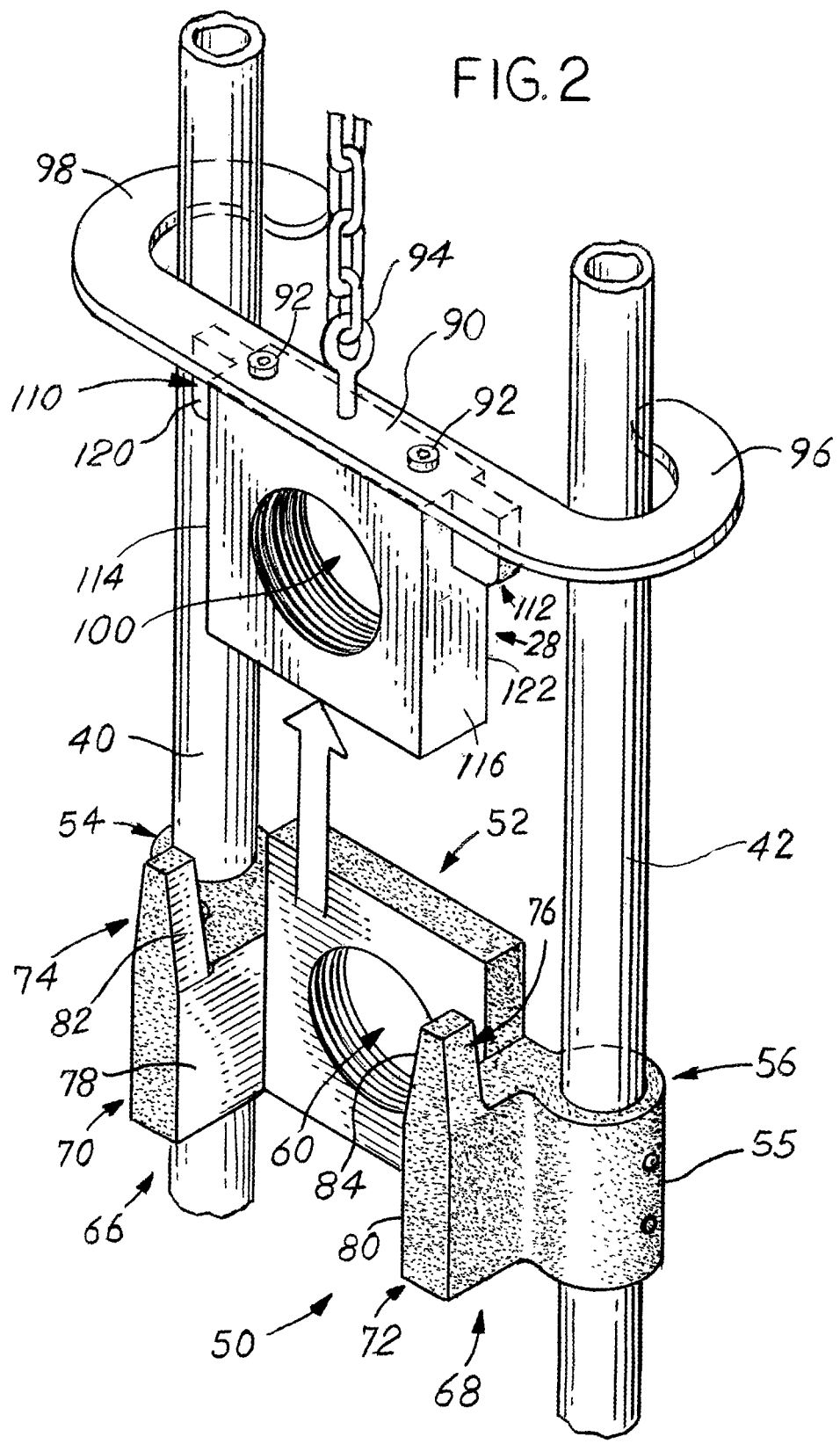
FIG. 2 is a partial isometric view 2 of the system shown in FIG. 1 with the outlet body and receiver body decoupled.

The pump 14 has an outlet 24 that is connected to a discharge pipe 26 that terminates into an outlet body 28, shown in FIGS. 2 and 4. A check valve may be located on the discharge pipe 26 between the outlet 24 and the outlet body 28. Located near the outlet 24 on the discharge pipe 26 is a pump guide plate 30 that is planar and has guide arm portions 32, 34, shown in FIG. 3. The guide arm portions 32, 34 partially encircle the guide rails 40, 42 and include a cutout area 36 that allows the guide plate 30 to clear a receiver body 50 as the pump 14 is lifted out for service. Terminal ends of the guide arm portions 32, 34 are spaced to allow the pump guide plate 30 to only be removed vertically. The guide arm portions 32, 34 are shaped to allow them to clear the receiver body, particularly ear portions 54, 56.

The outlet body 28 has a face seal 38 located in a groove that is recessed from a outlet sealing surface 48, shown in FIG. 7. The outlet body 28 further includes tabs 110, 112, that extend outwardly from side surfaces 114, 116. Each tab 110, 112 has a corresponding biasing surface 120, 122. The tabs 110, 112 each have a bottom surface 102, 104. The outlet body 28 has a top surface 118 that has threaded holes.

The system 10 includes a set of parallel guide rails 40, 42 that are affixed to the floor 18 through a lower mounting bracket 44. As shown in FIG. 1, the guide rails 40, 42 have upper terminal ends that are close to the lid 20, an lower terminal ends that are shown as located in the lower mounting bracket 44. The lower mounting bracket 44 maintains the location and spacing of the rails 40, 42. An upper mounting bracket 46 affixes to the sidewall 22 and maintains the spacing of the rails 40, 42. Located between the upper 46 and lower 44 mounting brackets is the receiver body 50. The outlet body 28 and receiver body 50 are commonly formed from cast iron, but any other material that resists corrosion can be used. It is common that the outlet body 28 and receiver body 50 are covered in an anti-corrosion coating. The receiver body 50 is designed to couple and seal to the outlet body 28. The receiver body 50, as well as the outlet body 28, is symmetrical about a vertical plane. The receiver body 50 has a coupling portion 52 located in the center and has ear portions 54, 56 on either side. The ear portions 54, 56 are designed to affix the receiver body 50 to the guide rails 40, 42. The ear portions 54, 56 each have set screws 55 that extend through the ear portions to impinge on the corresponding guide rail 40, 42. Each ear portion 54, 56 has a corresponding upper surface 106, 108. The upper surfaces 106, 108 are commonly rough and not machined or tightly controlled. The coupling portion 52 has a smooth coupling surface 58 and a centrally located hole 60 that extends through the body 50. The coupling surface 58 is smooth to allow it to be sealed to the outlet body 28. The hole 60 has a central axis 62 that is perpendicular to the coupling surface 58. The hole 60 is threaded to receive a pipe, however it is contemplated that other connection methods to the pipe are used. Located on the coupling portion 52 and bordering the coupling surface 58 is a first guide 66 and a second guide 68. The upper surface 106 extends between the first guide 66 and the coupling portion 52. The upper surface 108 extends between the second guide 68 and the coupling portion 52. The first and second guides 66, 68 each have several surfaces that are critical to proper coupling and uncoupling with the outlet body 28. Each guide 66, 68 has an offsetting portion 70, 72 and a clamping guide portion 74, 76. The offsetting portions 70, 72 extend outwardly from the coupling portion 52 and the clamping guide portions 74, 76 extend upwardly from the offsetting portions 70, 72. The offsetting portions have centering surfaces 78, 80 that intersect the coupling surface 58. The centering surfaces 78, 80 are parallel to and face each other. The clamping guide portions 74, 76 have alignment surfaces 82, 84 that extend into the centering surfaces 78, 80. Clamping ramped surfaces 86, 88, shown in FIG. 9, extend from terminal tips 87, 89 and face the coupling surface 58.

An upper guide plate 90 is affixed to the outlet body's upper surface 118 with fasteners 92. A retrieval chain 94 may also be affixed. The upper guide plate 90 has guide arm portions 96, 98 that are C shaped. The upper guide plate 90 constrains the lateral position of the outlet body 28 as it is moved vertically and prevents it from becoming decoupled from the guide rails 40, 42. The guide plate 90 keeps the outlet body 28 restrained due to the spacing and size of the guide arm portions 96, 98. The guide plate 90 has an opening located between the terminal ends of the guide arm portions, as shown in FIG. 2. The opening is narrower than the distance between the guide rails 40, 42. This narrower distance prevents the guide plate 90 and outlet body 28 from falling off the rails and allows it to only be moved vertically along the rails 40, 42.

The user can uncouple the outlet body 28 from the receiver body 50 by lifting the outlet body 28 straight up towards the lid 20. The decoupling action is shown in FIG. 2. The guide plate 90 and pump guide plate 30 constrain the pump 14, discharge pipe 26, and outlet body 28 so that they can only be removed vertically through the top of the basin 12.

The biasing surfaces 120, 122 are used to compress the seal 38 to the mating surface 58 on the receiver body. The side surfaces 114, 116, extending between the outlet sealing surface 48 ad an outwardly facing surface 41, are used to center the outlet body 28 to the receiver body 50. As the pump 14, discharge pipe 26, and outlet body 28 are installed, the guide plates 30, 90 constrain them to the rails 40, 42, as shown in FIGS. 2 and 3. As the components are lowered, the outlet body 28 begins to engage the receiver body 50. The alignment surfaces 82 and 84 begin to horizontally center the outlet body 28. The surfaces on the outlet body 28 and receiver body 50 cooperate to align and seal the outlet body 28 to the receiver body and maintain that alignment and sealing through the forces of gravity. The cooperation of the alignment surfaces is shown in FIGS. 6 and 8. The tabs 110, 112 slide against the clamping ramped surfaces 86, 88 to move the outlet sealing surface 48 to the mating surface 58. The contact point 128 between the tab 112 and clamping ramped surface 88, shown in FIG. 8, is what positions and holds the outlet body 28 to the receiver body 50. A corresponding contact point is also between the clamping ramped surface 86 and tab 110. When fully mated, the bottom surface 102, 104 is spaced from the corresponding top surface 106, 108. Because the top surfaces 106, 108 are spaced from the corresponding bottom surfaces 102, 104, the rough and uncontrolled nature of the surfaces 106, 108 do not impact sealing or mating. The section view FIG. 7 shows the alignment of the centrally located hole 60 of the receiver body 50 and the centrally located hole or outlet fluid aperture 100 of the outlet body 28.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. An adjustable disconnect and rail system adapted to affix to a basin having a floor and a sidewall, said system adapted to removably connect a submersible pump to a discharge pipe extending through said sidewall, said system comprising:
   a first rail being an elongate member with an upper terminal end and a lower terminal end, a second rail being parallel to said first rail, said second rail having an upper terminal end and a lower terminal end, said first and second rails adapted to affix to said floor of said basin adjacent said lower terminal ends, said first and second rails adapted to affix to said sidewall of said basin;
   a receiver body slidable along said first and second rails having a first and second ear portion and a coupling portion affixed therebetween, said first ear portion receiving and encircling said first rail and said second ear portion receiving and encircling said second rail, said second ear portion being parallel to said first ear portion, each said ear portion having a set screw impinging and affixing said receiver body to said rails;
   said coupling portion having a coupling mating surface located between a first guide adjacent said first ear portion and a second guide adjacent said second ear portion, said coupling mating surface having a hole extending therethrough, each said guide having an offsetting portion extending perpendicularly from said coupling mating surface, said offsetting portion extending upwardly into a clamping guide portion having a corresponding clamping ramped surface facing and obliquely angled with respect to said coupling mating surface, said clamping ramped surface of said first guide being coplanar with said clamping ramped surface of said second guide, each said clamping guide portion having an alignment surface extending into a centering surface located on said offsetting portion, said alignment surface of said first guide obliquely angled with respect to said alignment surface of said second guide, said centering surface of said first guide parallel to said centering surface of said second guide, said coupling mating surface perpendicular to said hole;
   an outlet body having an outlet fluid aperture extending therethrough, said outlet body having an outlet sealing surface and an outwardly facing surface spaced therefrom to define a thickness, said outlet body having first and second side surfaces extending between said outlet sealing surface and said outwardly facing surface, said first side surface parallel to said second side surface and spaced therefrom, said outlet body having a first tab extending outwardly from said first side surface and a second tab extending outwardly from said second side surface, said first and second tabs located at a midpoint on said thickness, each said tabs having a biasing surface parallel to said outlet sealing surface, said biasing surfaces of said first and second tabs being coplanar, said outlet sealing surface having an annular groove and a seal retained therein;
   when said outlet body is located between said first guide and said second guide, said outlet body is coupled to said receiver body, said clamping ramped surface of first guide urges said first tab toward said coupling mating surface and said clamping ramped surface of said second guide urges said second tab toward said coupling mating surface, said outlet sealing surface faces and overlays said coupling mating surface; and an upper guide plate affixed to said outlet body, said guide plate being substantially planar with a uniform thickness, said guide plate having arcuate portions, each said arcuate portion having a guide arm portion with an opening larger than a diameter of each said rail.

2. The adjustable disconnect and rail system of claim 1, further comprising a pump guide plate adapted to be affixed to said discharge pipe adjacent said submersible pump, said discharge pipe is located between said submersible pump and said outlet body to create a fluid path therebetween.

3. The adjustable disconnect and rail system of claim 1, wherein said side surfaces are adjacent said centering surfaces when said coupling mating surface of said receiver body overlays said coupling mating surface of said outlet body and said apertures of said receiver body and said outlet body are aligned.

4. The adjustable disconnect and rail system of claim 1, wherein each said tabs have corresponding bottom surfaces and said ear portions each have an upper surface, when said outlet body is coupled to said receiver body, said bottom surfaces of said tabs remaining spaced from corresponding said upper surfaces on said ear portions.

5. An adjustable disconnect and rail system adapted to affix to a basin having a floor and a sidewall, said system adapted to removably connect a submersible pump to a discharge pipe extending through said sidewall, said system comprising:
a first rail being an elongate member with an upper terminal end and a lower terminal end, a second rail being parallel to said first rail, said second rail having an upper terminal end and a lower terminal end, said first and second rails adapted to affix to said floor of said basin adjacent said lower terminal ends, said first and second rails adapted to affix to said sidewall of said basin;
a receiver body having a first and second ear portion and a coupling portion affixed therebetween, said first ear portion adapted to receive and encircle said first rail and said second ear portion adapted to receive and encircle said second rail, said second ear portion being parallel to said first ear portion, each said ear portion having a set screw adapted to impinge and affix said receiver body to a complimentary said rail;
said coupling portion having a coupling mating surface located between a first guide adjacent said first ear portion and a second guide adjacent said second ear portion, said coupling mating surface having a hole extending therethrough, each said guide having an offsetting portion extending from said coupling mating surface, said offsetting portion extending into a clamping guide portion having a corresponding clamping ramped surface facing and obliquely angled with respect to said coupling mating surface, said clamping ramped surface of said first guide being coplanar with said clamping ramped surface of said second guide, each said clamping guide portion having an alignment surface extending into a centering surface located on said offsetting portion, said alignment surface of said first guide obliquely angled with respect to said alignment surface of said second guide, said centering surface of said first guide parallel to said centering surface of said second guide, said coupling mating surface perpendicular to said hole; and an outlet body having an outlet fluid aperture extending therethrough, said outlet body having an outlet sealing surface and an outwardly facing surface, said outlet body having first and second side surfaces extending between said outlet sealing surface and said outwardly facing surface, said first side surface parallel to said second side surface and spaced therefrom, said outlet body having a first tab extending outwardly from said first side surface and a second tab extending outwardly from said second side surface, each said tabs having a biasing surface parallel to said outlet sealing surface, said biasing surfaces of said first and second tabs being coplanar, said outlet sealing surface having an annular groove and a seal retained therein.

6. The adjustable disconnect and rail system of claim 5, further comprising a pump guide plate adapted to be affixed to said discharge pipe adjacent said submersible pump, said discharge pipe is located between said submersible pump and said outlet body to create a fluid path therebetween.

7. The adjustable disconnect and rail system of claim 5, wherein said side surfaces are adjacent said centering surfaces when said coupling, mating surface of said receiver body overlays said coupling mating surface of said outlet body and said apertures of said receiver body and said outlet body are aligned.

8. The adjustable disconnect rail system of claim 5, wherein said coupling mating surface of said outlet body has a groove recessed into said outlet body, said groove adapted to receive the seal.

9. The adjustable disconnect and rail system of claim 5, an upper guide plate adapted to be affixed to said outlet body, said guide plate being substantially planar with a uniform thickness, said guide plate having an arcuate portions, each said arcuate portion having a guide arm portion with an opening larger than a diameter of each said rail.

10. The adjustable disconnect and rail system of claim 5, when said outlet body is located between said first guide and said second guide, said outlet body is coupled to said receiver body, said clamping ramped surface of first guide urges said first tab toward said coupling mating surface and said clamping ramped surface of said second guide urges said second tab toward said coupling mating surface, said outlet sealing surface faces and overlays said coupling mating surface.

11. An adjustable disconnect adapted to affix to a basin having a floor and a sidewall, said basin having a first rail being an elongate member with an upper terminal end and a lower terminal end, a second rail being parallel to said first rail, said second rail having an upper terminal end and a lower terminal end, said first and second rails adapted to affix to said floor of said basin adjacent said lower terminal ends, said first and second rails adapted to affix to said sidewall of said basin, said disconnect adapted to removably connect a submersible pump to a discharge pipe extending through said sidewall, said disconnect comprising:
a receiver body having a first and second ear portion and a coupling portion affixed therebetween, said first ear portion adapted to receive and encircle said first rail and said second ear portion adapted to receive and encircle said second rail, said second ear portion being parallel to said first ear portion, each said ear portion having a set screw adapted to impinge and affix said receiver body to a complimentary said rail;
said coupling portion having a coupling mating surface located between a first guide adjacent said first ear portion and a second guide adjacent said second ear portion, said coupling mating surface having a hole extending therethrough, each said guide having an offsetting portion extending from said coupling mating surface, said offsetting portion extending into a clamping guide portion having a corresponding clamping ramped surface facing and obliquely angled with respect to said coupling mating surface, said clamping ramped surface of said first guide being coplanar with said clamping ramped surface of said second guide, each said clamping guide portion having an alignment surface extending into a centering surface located on said offsetting portion, said alignment surface of said first guide obliquely angled with respect to said alignment surface of said second guide, said centering surface of said first guide parallel to said centering surface of said second guide, said coupling mating surface perpendicular to said hole; and an outlet body having an outlet fluid aperture extending therethrough, said outlet body having an outlet sealing surface and an outwardly facing surface, said outlet body having first and second side surfaces extending between said outlet sealing surface and said outwardly facing surface, said first side surface parallel to said second side surface and spaced therefrom, said outlet body having a first tab extending outwardly from said first side surface and a second tab extending outwardly from said second side surface, each said tabs having a biasing surface parallel to said outlet sealing surface, said biasing surfaces of said first and second tabs being coplanar, said outlet sealing surface having an annular groove and a seal retained therein.

12. The disconnect of claim 11, an upper guide plate adapted to be affixed to a top surface of said outlet body, said guide plate being substantially planar with a uniform thickness, said guide plate having arcuate portions, each said arcuate portion having a guide arm portion with an opening larger than a diameter of each said rail.

13. The disconnect of claim 11, further comprising a pump guide plate adapted to be affixed to said discharge pipe adjacent said submersible pump, said discharge pipe is located between said submersible pump and said outlet body to create a fluid path therebetween.

14. The disconnect of claim 11, wherein said side surfaces are adjacent said centering surfaces when said coupling mating surface of said receiver body overlays said coupling mating surface of said outlet body and said apertures of said receiver body and said outlet body are aligned.

15. The disconnect of claim 11, wherein said mating surface of said outlet body has a groove recessed into said outlet body, said groove adapted to receive the seal.

16. The disconnect of claim 11, when said outlet body is located between said first guide and said second guide, said outlet body is coupled to said receiver body, said clamping ramped surface of first guide urges said first tab toward said coupling mating surface and said clamping ramped surface of said second guide urges said second tab toward said coupling mating surface, said outlet sealing surface faces and overlays said coupling mating surface.

* * * * *